(12) United States Patent
Rawer

(10) Patent No.: US 12,371,054 B1
(45) Date of Patent: Jul. 29, 2025

(54) USING RADAR FOR VEHICLE-TO-VEHICLE (V2V) COMMUNICATION

(71) Applicant: Ambarella International LP, Santa Clara, CA (US)

(72) Inventor: Marc Rawer, Bühl (DE)

(73) Assignee: Ambarella International LP, Santa Clara, CA (US)

( * ) Notice: Subject to any disclaimer, the term of this patent is extended or adjusted under 35 U.S.C. 154(b) by 263 days.

(21) Appl. No.: 18/097,715

(22) Filed: Jan. 17, 2023

(51) Int. Cl.
*B60W 60/00* (2020.01)
*G01S 13/88* (2006.01)
*H04W 4/46* (2018.01)

(52) U.S. Cl.
CPC .......... *B60W 60/001* (2020.02); *G01S 13/88* (2013.01); *H04W 4/46* (2018.02); *B60W 2420/408* (2024.01); *B60W 2554/4044* (2020.02); *B60W 2556/65* (2020.02)

(58) Field of Classification Search
CPC ......... B60W 60/001; B60W 2420/408; B60W 2554/4044; B60W 2556/65; G01S 13/88; H04W 4/46
See application file for complete search history.

(56) References Cited

U.S. PATENT DOCUMENTS

| 8,443,301 B1 * | 5/2013 | Easterly | G07C 5/006 |
| | | | 715/848 |
| 2016/0231746 A1 * | 8/2016 | Hazelton | G05D 1/0274 |

OTHER PUBLICATIONS

Akan, Ozgur B., and Muharrem Arik. "Internet of radars: Sensing versus sending with joint radar-communications." IEEE Communications Magazine 58.9 (2020): 13-19. (Year: 2020).*
Kafafy, Mai, Ahmed S. Ibrahim, and Mahmoud H. Ismail. "Optimized modulation order for V2V communication over index-modulated radar signals." Vehicular Communications 36 (2022): 100492. (Year: 2022).*

* cited by examiner

*Primary Examiner* — Peter D Nolan
*Assistant Examiner* — Ana D Thomas
(74) *Attorney, Agent, or Firm* — Maiorana Patent Law, PA

(57) ABSTRACT

An apparatus comprises an interface and a processor. The interface may be configured to (i) receive sensor readings from a plurality of sensors of a vehicle, (ii) communicate waveform characteristic data to a radar transceiver module, and (iii) receive return data from the radar transceiver module. The processor may be configured to (i) generate first status information about the vehicle based on the sensor readings and (ii) generate the waveform characteristic data based on the first status information about the vehicle.

19 Claims, 7 Drawing Sheets

USING RADAR FOR VEHICLE-TO-VEHICLE (V2V) COMMUNICATION

FIELD OF THE INVENTION

The invention relates to vehicle-to-vehicle (V2V) communication generally and, more particularly, to a method and/or apparatus for implementing V2V communication using radar.

BACKGROUND

In an autonomous driving (AD) or semi-AD use-case relative vehicle movements are relevant for planning maneuvers. Vehicle-to-vehicle (V2V) communication can increase safety in driving situations, especially in challenging weather conditions. Vehicles could transfer information regarding current status and planned maneuvers. Using the status and planned maneuver information from other vehicles, a lane change maneuver or a maneuver entering from a side-street to a main street could be planned more robustly. Currently, technologies like fifth generation (5G) cellular communication or WiFi (IEEE 802.11abcgnx) are used. Ranges of the existing technologies are rather small, but may also communicate to infrastructure (V2X). Since future vehicles will be equipped with radar, it could be helpful to also embed information of current status and planned maneuvers in a radar chirp.

It would be desirable to implement vehicle-to-vehicle (V2V) communication using radar.

SUMMARY

The invention concerns an apparatus comprising an interface and a processor. The interface may be configured to (i) receive sensor readings from a plurality of sensors of a vehicle, (ii) communicate waveform characteristic data to a radar transceiver module, and (iii) receive return data from the radar transceiver module. The processor may be configured to (i) generate first status information about the vehicle based on the sensor readings and (ii) generate the waveform characteristic data based on the first status information about the vehicle.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing vehicle-to-vehicle (V2V) communication using radar that may (i) communicate vehicle status information (e.g., unique identifier of the vehicle (UID), current vehicle position and velocity vector, planned vehicle velocity vector, human or autonomous operation, etc.) between vehicles, (ii) communicate vehicle status information using the radar chirp, (iii) be implemented utilizing existing hardware, (iv) allow lane change maneuvers and/or maneuvers entering a main street from a side-street to be planned more robustly, and/or (v) be implemented as one or more integrated circuits.

Figure 1:
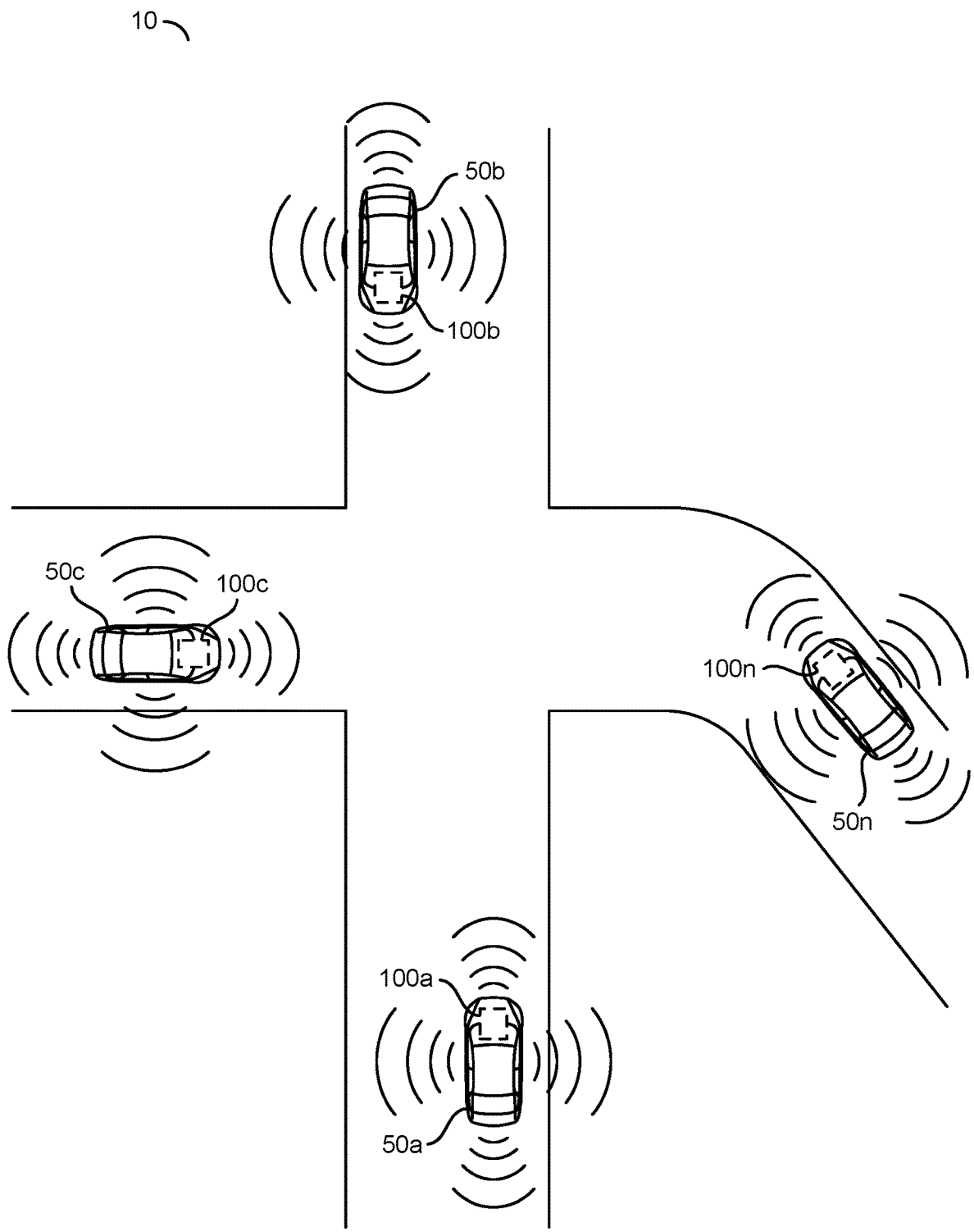
FIG. 1 is a diagram illustrating an environmental context showing vehicles utilizing vehicle-to-vehicle (V2V) communication utilizing radar in accordance with an embodiment of the invention.

Referring to FIG. 1, a diagram is shown illustrating a context showing vehicles utilizing vehicle-to-vehicle (V2V) communication utilizing radar in accordance with an embodiment of the invention. In an example, a diagram is shown illustrating an intersection 10. The intersection 10 is generally representative of roads meeting in urban and/or rural settings and forming an intersection. In an example, a plurality of vehicles 50a-50n are shown. Each of the plurality of vehicles 50a-50n is approaching the intersection 10. The intersection 10 is not shown to scale generally. Distances between the vehicles 50a-50n may be equal to, greater than, or smaller than one another.

Each of the vehicles 50a-50n may comprise a respective apparatus (or module or control unit) 100a-100n. Each of the apparatuses 100a-100n may implement vehicle-to-vehicle (V2V) communication utilizing radar in accordance with an embodiment of the invention. In an example, each of the apparatuses 100a-110n may be configured to (i) broadcast radar signals (illustrated by the arced lines) into an environment surround the vehicles 50a-50n, (ii) receive the radar signals directly from the vehicles 50a-50n, and/or (iii) receive reflected signals generated by the radar signals broadcasted from the vehicles 50a-50n reflecting off the vehicles 50a-50n and/or other objects (or targets) in the environment surrounding the vehicles 50a-50n. In an example, the other objects (or targets) may comprise buildings, road signs, fences, trees and bushes, pedestrians, etc. (not shown).

In an example, the radar signals may be broadcast in one or more directions (e.g., forward-looking radar, side radar, rearward-looking radar, 360 degree radar, etc.). The respective radar signals broadcast by each of the vehicles 50a-50n may be configured to identify the source of the radar signal. In an example, a unique identification code (UID) of each of the vehicles 50a-50n may be embedded in the respective radar signals broadcast by each of the vehicles 50a-50n. In an example, the unique identification code (UID) of each of the vehicles 50a-50n may be embedded in a linear frequency-modulated waveform (LFMW), or chirp, of the respective radar signals. In an example, respective status information of each of the vehicles 50a-50n may also be embedded in the respective radar signals broadcast by each of the vehicles 50a-50n. In an example, the respective status information may be implemented as a simple status information message. In an example, the respective status information message may be formatted similarly to communication standards defined by the National Marine Electronics Association (NMEA), which are used in marine navigation. In an example, a vehicle status message may be generated comprising a number of fields containing various vehicle status parameters. In an example, a first field may contain the UID of the vehicle that is broadcasting the status message.

In an example, the respective status information of each of the vehicles 50a-50n may comprise, but is not limited to, a position of the vehicle, a direction of travel of the vehicle, a velocity of the vehicle, a destination of the vehicle, etc. In another example, the respective status information of each of the vehicles 50a-50n may comprise, but is not limited to, a planned maneuver of the vehicle (e.g., leaving a parking space, changing lanes, entering a main road from a side road or entrance ramp, etc.). In another example, the respective status information of each of the vehicles 50a-50n may comprise, but is not limited to, an operator status of the vehicle (e.g., human operation, fully autonomous (AD) operation, semi-AD operation, etc.) and/or a vehicle state (e.g., in a parking mode, in an urban driving mode, in a highway-pilot mode, in a limp-mode, having fallback system engaged, etc.). In general, the respective status information may comprise information that the vehicles 50a-50n would not be able to become aware of absent the V2V communication and just looking at the respective surroundings of the vehicles 50a-50n. In an example, each type of status information may be placed in a respective field of a vehicle status information message embedded in the radar signal.

Figure 2:
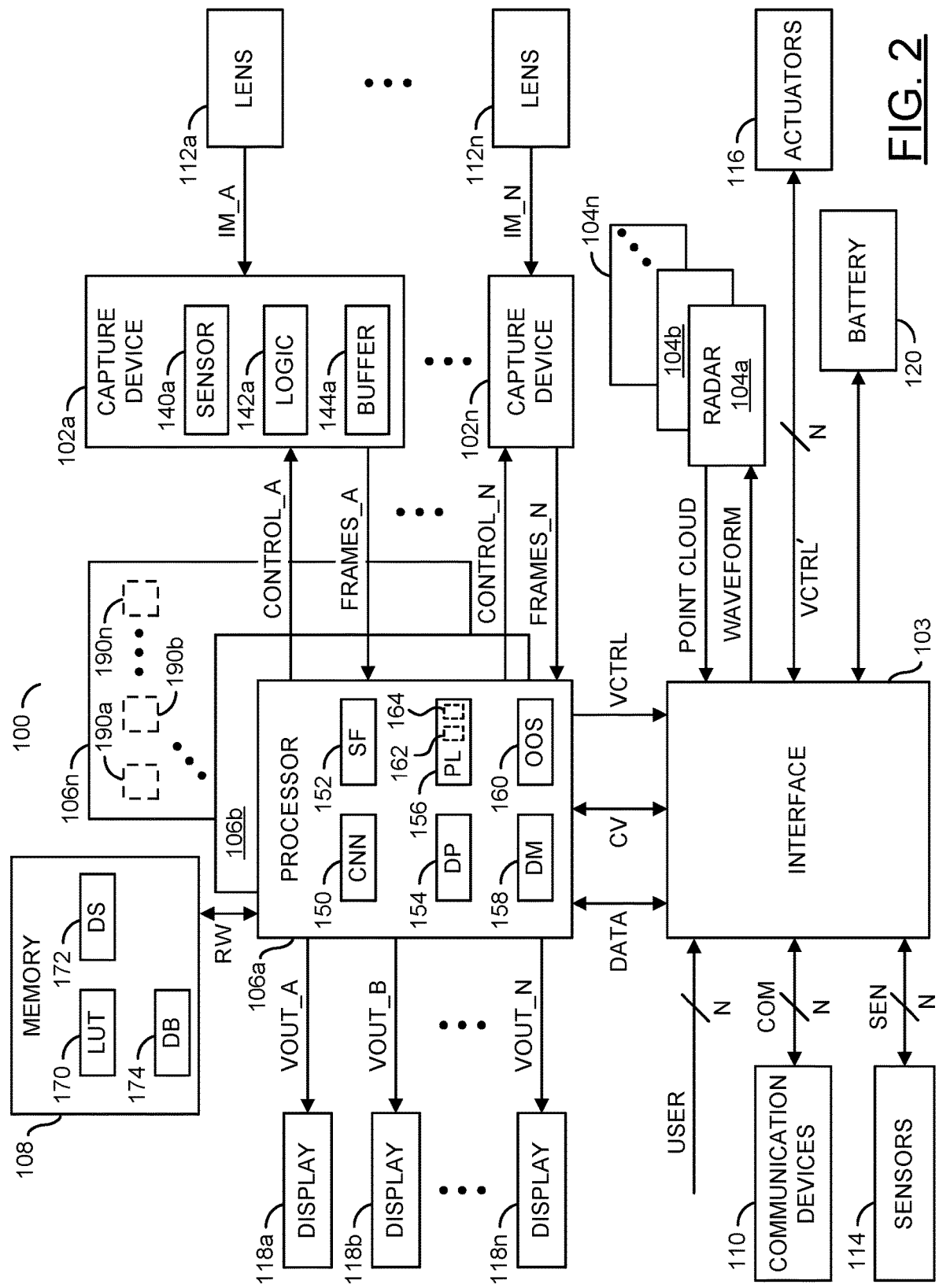
FIG. 2 is a diagram illustrating an example radar and camera system that may implement vehicle-to-vehicle (V2V) communication utilizing radar in accordance with an embodiment of the invention.

Referring to FIG. 2, a diagram illustrating an apparatus in accordance with an embodiment of the invention is shown. In various embodiments, an apparatus 100 may be implemented to provide vehicle-to-vehicle (V2V) communication utilizing radar in accordance with an embodiment of the invention is shown. In various embodiments, the apparatus 100 may be configured to receive sensor readings from a plurality of sensors of a vehicle, generate first status information about the vehicle based on the sensor readings, generate waveform characteristic data based on the first status information about the vehicle, and communicate the waveform characteristic data to a radar transmitter. In various embodiments, the apparatus 100 may be further configured to receive return data from a radar receiver, extract second status information about one or more other vehicles in an environment around the vehicle based on the return data, and update a driving plan of the vehicle based on the second status information about the one or more other vehicles.

In an example, the first status information may comprise a unique identifier for the vehicle. In an example, the first status information may further comprise one or more of a position of the vehicle, a direction of travel of the vehicle, a velocity of the vehicle, a destination of the vehicle, a planned maneuver of the vehicle, an operator status of the vehicle (e.g., human operation, fully autonomous (AD) operation, semi-AD operation, etc.), and a vehicle state of the vehicle (e.g., in a parking mode, in an urban driving mode, in a highway-pilot mode, etc.). In an example, the second status information may comprise a respective unique identifier for each of the one or more other vehicles. In an example, the second status information may further comprise one or more of a respective position of each of the one or more other vehicles, a respective direction of travel of each of the one or more other vehicles, a respective velocity of each of the one or more other vehicles, a respective destination of each of the one or more other vehicles, a respective planned maneuver of each of the one or more other vehicles, an operator status of the vehicle (e.g., human operation, fully autonomous (AD) operation, semi-AD operation, etc.), and/or a vehicle state of the vehicle (e.g., in a parking mode, in an urban driving mode, in a highway-pilot mode, etc.). In an example, the waveform characteristic data may be configured to embed the first status information in a radar probe signal transmitted by a radar transmitter. In an example, the waveform characteristic data may be configured to define a radar chirp transmitted by the radar transmitter.

In various embodiments, the apparatus 100 may be further configured to obtain pixel data (e.g., as pixel data streams) from a plurality of cameras and 4D point cloud data from a plurality of 4D imaging radar sensors distributed around a vehicle. In an example, the apparatus 100 may be configured to process the pixel data and the 4D point cloud data as one or more frames (e.g., image frames, video frames, etc.). In an example, the apparatus 100 may be configured to perform real-time processing of the pixel data and 4D point cloud data. In an example, the apparatus 100 may be configured to generate a 3D point cloud of a surrounding environment of a vehicle and track a plurality of objects around the vehicle. In an example, the apparatus 100 may be configured to generate the 3D point cloud by fusing pixel data streams from cameras with 4D point cloud data from 4D imaging radars.

In an example, the apparatus 100 may comprise and/or communicate with blocks (or circuits) 102a-102n, a block (or circuit) 103, blocks (or circuits) 104a-104n, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. In an example, the circuits 102a-102n may each implement a capture device. In an example, the circuit 103 may implement an interface circuit. In an example, the circuits 104a-104n may each implement a radar device. In an example, the circuits 104a-104n may each implement a 4D imaging radar device. In an example, the circuits 106a-106n may each implement a processor (or co-processors). In an example implementation, the circuits 106a-106n may each be implemented as a video processor, a digital signal processor, and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery, etc.). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed radar and camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 103 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 103 may be implemented as multiple interfaces each supporting different communication protocols. In another example, the communication devices 110 may be implemented as many modules, each implementing a different communications standard or protocol (e.g., Bluetooth, Wi-Fi, LTE, CAN bus, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a vehicle). Some of the lenses 112a-112n may be implemented to provide a targeted view of an interior of the object (e.g., a cabin or passenger compartment of the vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a stereoscopic and/or panoramic view of the environment and/or the interior of the vehicle. The lenses 112a-112n may be arranged to capture fields of view above and/or below a level of the vehicle. In some embodiments, lenses 112a-112n may be implemented having a wide angle (or fisheye) lens. A panoramic video may be generated comprising a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer (memory). For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n through wireless communication. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth (or distance) sensing (e.g., the signals FRAMES_A-FRAMES_N may comprise depth (or distance) information and/or vector light data in addition to the video frames). In one example, the capture devices 102a-102n and/or the processors 106a-106n may perform depth (or distance) sensing using multiple cameras (e.g., cameras configured as a stereo pair to capture a depth map). In another example, the capture devices 102a-102n and/or the processors 106a-106n may perform depth (or distance) sensing using time-of-flight. In yet another example, the capture devices 102a-102n and/or the processors 106a-106n may perform depth (or distance) sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 103 may be configured to transmit and/or receive a number of signals. The interface circuit 103 may be configured to communicate information and/or convert information to/from various protocols. In some embodiments, the interface circuit 103 may be implemented as one of the components of the processors 106a-106n. In some embodiments, the interface circuit 103 may be implemented as a vehicle bus (e.g., a computer area network (CAN) bus). For example, for low speed communication, the vehicle CAN bus may be implemented. In some embodiments, the interface circuit 103 may implement a high speed data transmission protocol (e.g., for video transmission). For example, the interface circuit 103 may implement one or more of Ethernet, PCI-e, MIPI, etc. In some embodiments, the interface circuit 103 may comprise many different components, each configured to communicate using a particular protocol. The interface circuit 103 may comprise a data bus, traces, connectors, wires and/or pins. The implementation of the interface circuit 103 may be varied according to the design criteria of a particular implementation.

In the example shown, the interface circuit 103 may send and/or receive a signal (e.g., DATA), a signal (e.g., CV), a signal (e.g., VCTRL), a signal (e.g., COM), a signal (e.g., SEN), a signal (e.g., POINT CLOUD), a signal (e.g., WAVEFORM), a signal (e.g., VCTRL'), and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal POINT CLOUD may be implemented as a communication interface. In an example, the signal POINT CLOUD may communicate vehicle status information broadcast by other vehicles and/or point cloud (tracking) data generated (extracted) by the radar devices 104a-104n. In another example, the signal POINT CLOUD may communicate return data received by the radar devices 104a-104n, and the processors 106a-106n may extract the vehicle status information broadcast by other vehicles and/or the point cloud (tracking) data. In an example, the signal WAVEFORM may communicate waveform characteristic data used by the radar devices 104a-104n to broadcast vehicle status information. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 103 may be varied according to the design criteria of a particular implementation.

In an example, the radar sensors 104a-104n may each comprise a high-resolution 4D imaging radar. In an example, the 4D imaging radar sensors 104a-104n may implement 4D millimeter-wave (mmw) imaging radars. In general, the 4D imaging radar sensors 104a-104n may be configured to determine a location of an object in range, azimuth, elevation, and relative speed to provide detailed information about an environment within view of the radar. The 4D imaging radar sensors 104a-104n may be configured to communicate status information about the vehicle to other vehicles. In an example, the status information about the vehicle may be communicated by the signal WAVEFORM from the interface circuit 103 and/or the processors 106a-106n to the 4D imaging radar sensors 104a-104n. In an example, the 4D imaging radar sensors 104a-104n may be configured to generate (broadcast) a radar chirp based on waveform characteristic data communicated by the signal WAVEFORM. The 4D imaging radar sensors 104a-104n may be configured to communicate status information about other vehicles in the environment surrounding the vehicle to the interface circuit 103 and/or the processors 106a-106n by the signal POINT CLOUD. In an example, the 4D imaging radar sensors 104a-104n may be configured to communicate information about objects in the environment within view of the radars 104a-104n as a stream of 4D point cloud data comprising range, azimuth, elevation, and relative speed. In an example, the 4D point cloud data may be communicated by the signal POINT CLOUD to the interface circuit 103 and/or the processors 106a-106n. In an example, the 4D imaging radar sensors 104a-104n may have a field of view (FOV) that overlaps a field of view of the capture devices 102a-102n.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural network (ANN) modules. In an example, the block 150 may implement a convolutional neural network (CNN) module. The block 152 may implement a sensor fusion module. The block 154 may implement a driving policy (DP) module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may omit one or more of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL and the signals (e.g., VOUT_A-VOUT_N), and/or send/receive the signal DATA, the signal CV, the signal POINT CLOUD, the signal WAVEFORM, and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N and the signal POINT CLOUD. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a lookup table. The block 172 may implement data storage. The block 174 may implement database storage (e.g., image feature sets, vehicle status, view options, GNSS/GPS positions, a schedule of a user, driver behavior, expected travel times/routes, user preferences, calibrated extrinsic parameters for the radars 104a-104n, etc.). The memory 108 may be configured to store computer readable/executable instructions (or firmware or code). The instructions, when executed by the processors 106a-106n, may perform a number of steps (or operations). In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement global positioning system (GPS) and/or global navigation satellite system (GNSS) functionality. In one example, the communication device 110 may be a hardwired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth®, ZigBee®, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultrasound device, an array of ultrasound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera display and/or a bird's-eye view camera display. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface circuit 103. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured to perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement a Red-Green-Blue-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and an NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n, radar devices 104a-104n, and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2V, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by a 4D imaging radar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but one of the radar devices 104a-104n may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel) The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG) The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

In an example, the disparity engine 164 may be configured to determine a distance based on images captured as a stereo pair. Two or more of the capture devices 102a-102n may be configured as a stereo pair of cameras (e.g., a stereo camera). The capture devices 102a-102n configured as a stereo pair may be implemented close to each other at a predefined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the predefined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc. In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360-degree video, a wide angle video, a video having less than a 360-degree field of view, etc. In some embodiments, the panoramic video may provide coverage for a full 360-degree field of view. In some embodiments, less than a 360-degree view may be captured by the panoramic video (e.g., a 270-degree field of view, a 180-degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video and/or point cloud stitching operations to stitch together video and point cloud frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 190a-190n. While the blocks 190a-190n are shown on the processor 106n, each of the processors 106a-106n may implement one or more of the blocks 190a-190n. The blocks 190a-190n may implement various hardware modules implemented by the processors 106a-106n. The hardware modules 190a-190n may be configured to provide various hardware components that may be used by the processors 106a-106n to efficiently perform various operations. Various implementations of the processors 106a-106n may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processors 106a-106n using the dedicated hardware modules 190a-190n may enable the processors 106a-106n to be highly optimized and/or customized to limit power consumption, reduce heat generation and/or increase processing speed compared to software implementations.

The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 190a-190n may be configured to extract feature points from the video frames. The CNN module 150 may be configured to analyze pixels of the video frames and/or groups of pixels of the video frame. One or more of the dedicated hardware modules 190a-190n may be configured to perform particular mathematical operations that may be performed multiple times to perform the analysis of the pixels and/or groups of pixels. The operations performed by the dedicated hardware modules 190a-190n may be configured to calculate descriptors based on the feature points. The dedicated hardware modules 190a-190n may be configured to compare the descriptors to reference descriptors stored in the memory 108 to determine whether the pixels of the video frames correspond to a particular object.

Figure 3:
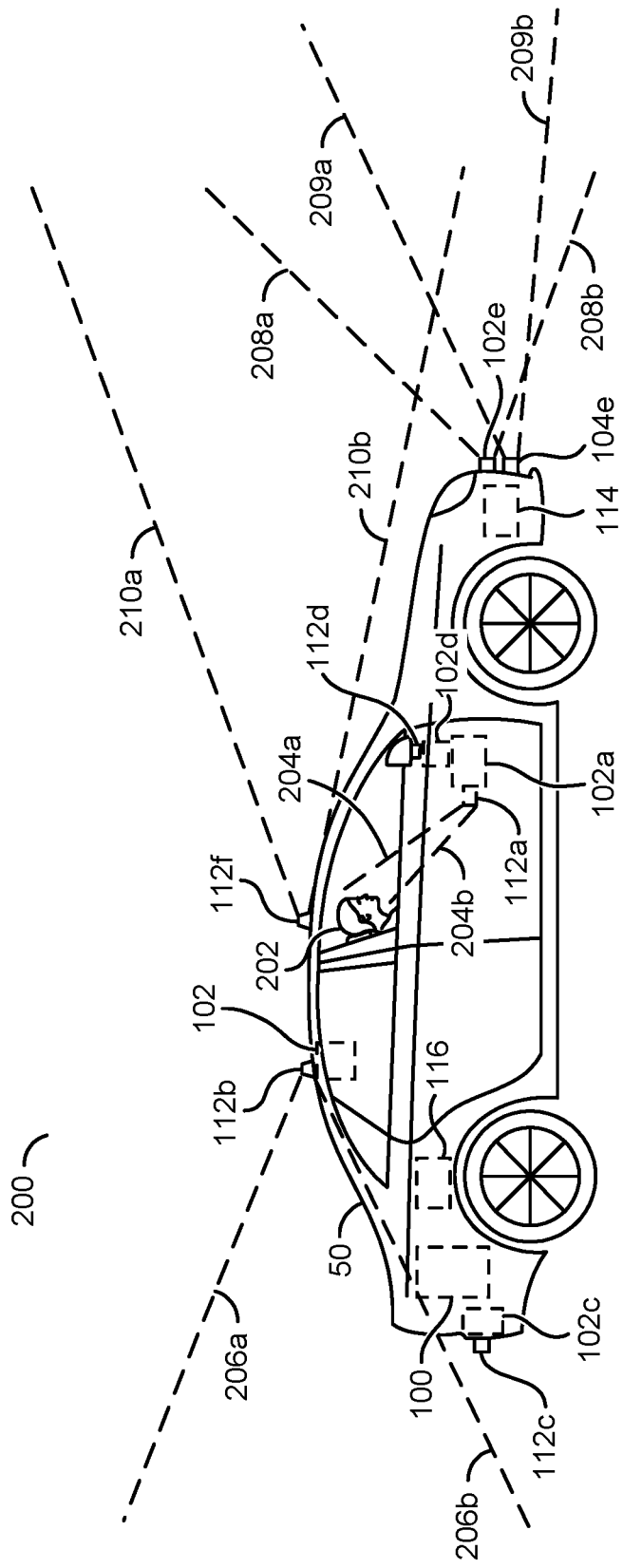
FIG. 3 is a diagram illustrating an example of radar and camera systems inside and outside of a vehicle.

Referring to FIG. 3, a diagram illustrating an example embodiment 200 of radar and camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d, the 4D imaging radars 104a-104n, and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e and the capture device 102e) may provide a front exterior view of an area. A targeted view (e.g., represented by a line 209a and a line 209b covered by the 4D imaging radar 104e) may provide another front exterior view of the area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras and/or radars implemented, a direction captured, an orientation of the cameras and/or radars, and/or an arrangement of the cameras and/or radars may be varied according to the design criteria of a particular implementation.

The capture devices 102a-102n may be configured to capture video data of the environment around (e.g., area near) the ego vehicle 50. The 4D imaging radar sensors 104a-104n may be configured to capture 4D point cloud data of the environment around (e.g., area near) the ego vehicle 50. The processors 106a-106n may implement computer vision and sensor fusion to detect objects and/or understand what is happening near the ego vehicle 50 (e.g., see the environment as a human driver would see the environment). The sensors 114 may be implemented using proximity detection technology. For example, the vehicle sensors 114 may implement additional sensing using a radar device, an array of radars, a sonar device, an array of sonars, a light detection and ranging (lidar) device, an array of lidar devices, an ultrasound device, an array of ultrasound devices, etc.

The sensor fusion module 152 may aggregate data from the capture devices 102a-102n, the 4D imaging radar sensors 104a-104n, the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location, and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114, and/or internally generated signals such as signals generated by the processors 106a-106n in response to analysis of the video data, the 4D point cloud data, and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360-degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious), and/or determine an expected path of a detected object (e.g., determine speed, acceleration and direction to determine a trajectory). The expected path may be further determined based on context such as the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a predetermine threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the use of the plurality of capture devices 102a-102n and the sensors 114 (e.g., radar, time-of-flight (ToF), occupancy sensors, temperature sensors, location/orientation sensors, ultrasonic, etc.). The type of capture devices and/or sensors implemented may be varied according to the design criteria of a particular implementation.

The memory 108 may store the predetermined locations and/or a predetermined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360-degree field of view, less than a 360-degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 4:
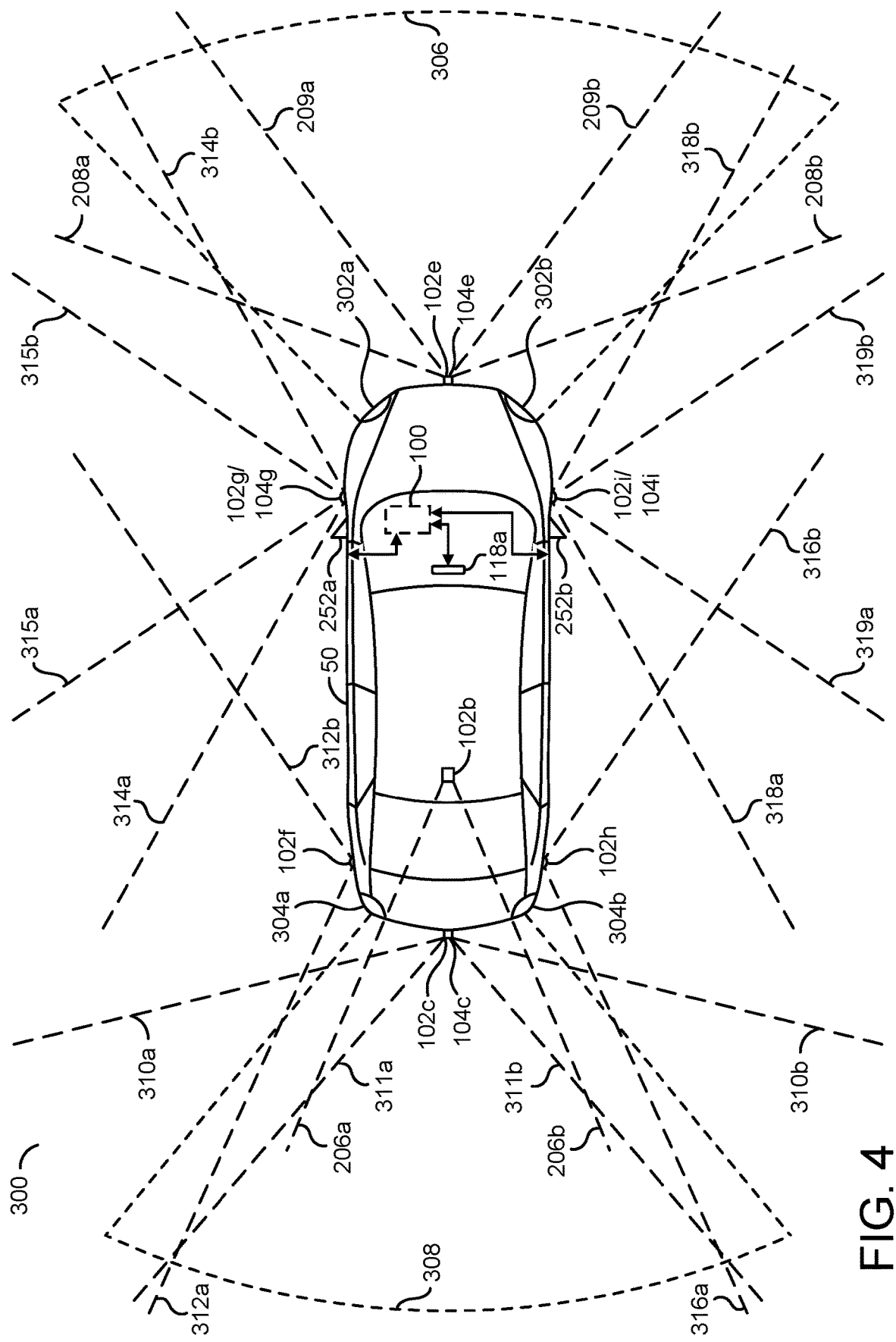
FIG. 4 is a diagram illustrating a vehicle radar and camera system capturing an all-around view.

Referring to FIG. 4, a diagram illustrating an exterior view from a vehicle and areas of illumination around the vehicle is shown. An overhead (or bird's eye) view 300 of the ego vehicle 50 is shown. The apparatus 100 is shown within the ego vehicle 50. A subset of the capture devices 102a-102n and the 4D imaging radar devices 104a-104n are shown on the ego vehicle 50. The display 118a is shown within the ego vehicle 50. While only one of the displays 118a is shown as a representative example, generally the ego vehicle 50 may comprise more than one of the displays 118a-118n.

Front headlights 302a-302b are shown on a front end of the ego vehicle 50. Rear taillights 304a-304b are shown on a rear end of the ego vehicle 50. The front headlights 302a-302b may be configured to provide illumination out towards the front of the ego vehicle 50. A dotted shape 306 is shown in front of the ego vehicle 50 and extending from the front headlights 302a-302b. The dotted shape 306 may represent a range of illumination generated by the front headlights 302a-302b. Similarly, a dotted shape 308 is shown behind the ego vehicle 50 and extending from the rear taillights 304a-304b. The dotted shape 308 may represent a range of illumination generated by the rear taillights 304a-304b. The color, intensity and/or range of light of the front illumination 306 and the rear illumination 308 may be varied according to the design criteria of a particular implementation.

In the example overhead view 300, the capture device 102b, the capture device 102c, the capture device 102e, the capture device 102f, the capture device 102g, the capture device 102h, and the capture device 102i are shown. The 4D imaging radar 104c, the 4D imaging radar 104e, the 4D imaging radar 104g, and the 4D imaging radar 104i are also shown. Each of the capture devices 102a-102i may be directed to capture a different field of view. Each of the 4D imaging radars 104a-104i may be directed to broadcast radar signals and the vehicle status information to a different field of view that overlaps a respective field of view of the capture devices 102a-102i. Each of the 4D imaging radars 104a-104i may be directed to capture return signals from a different field of view that overlaps a respective field of view of the capture devices 102a-102i. In an example, the lens 112b of the capture device 102b may capture the field of view 206a-206b to provide a view behind the ego vehicle 50 and the lens 112e of the capture device 102e may capture the field of view 208a-208b to provide a view in front of the ego vehicle 50. The 4D imaging radar may also capture the field of view 209a-209b to provide a view in front of the ego vehicle 50. Dotted lines 310a-310b and 311a-311b are shown extending from the capture device 102c and the 4D imaging radar 104c, respectively (e.g., from a rear bumper location). The dotted lines 310a-310b may represent the field of view captured by the lens 112c and the dotted lines 311a-311b may represent the field of view captured by the 4D imaging radar 104c. The fields of view 310a-310b and 311a-311b may provide wide angle fields of view toward the rear of the ego vehicle 50.

Dotted lines 312a-312b are shown extending from the capture device 102f (e.g., from a rear driver side location). The dotted lines 312a-312b may represent the field of view captured by the lens 112f. The field of view 312a-312b may provide a rear driver side field of view out from the ego vehicle 50. Dotted lines 314a-314b and 315a-315b are shown extending from the capture device 102g and 4D imaging radar device 104g, respectively (e.g., located below the driver side mirror 252a). The dotted lines 314a-314b may represent the field of view captured by the lens 112g. The dotted lines 315a-315b may represent the field of view broadcasted to and captured by the 4D imaging radar 104g. The fields of view 314a-314b and 315a-315b may provide a driver side field of view out from the ego vehicle 50. Dotted lines 316a-316b are shown extending from the capture device 102h (e.g., from a rear passenger side location). The dotted lines 316a-316b may represent the field of view captured by the lens 112h. The field of view 316a-316b may provide a rear passenger side field of view out from the ego vehicle 50. Dotted lines 318a-318b and 319a-319b are shown extending from the capture device 102i and the 4D imaging radar device 104i, respectively (e.g., located below the passenger side mirror 252b). The dotted lines 318a-318b may represent the field of view captured by the lens 112i. The dotted lines 319a-319b may represent the field of view broadcasted to and captured by the 4D imaging radar 104i. The fields of view 318a-318b and 319a-319b, respectively, may provide a passenger side field of view out from the ego vehicle 50.

In an example, each of the fields of view captured by the lenses 112a-112n may be presented as video data to the displays 118a-118n and/or analyzed by the processors 106a-106n. The lenses 112a-112n, the 4D imaging radars 104a-104n, and the corresponding fields of view (e.g., the fields of view 206a-206b, 208a-208b, 209a-209b, 310a-310b, 311a-311b, 312a-312b, 314a-314b, 315a-315b, 316a-316b, 318a-318b, and 319a-319b) are shown as an illustrative example. In some embodiments, the apparatus 100 may implement an all-around view system utilizing at least four of the capture devices 102a-102n and four of the 4D imaging radars 104a-104n. For example, the capture device 102e implemented on a front of the ego vehicle 50, the capture device 102c implemented on a rear of the ego vehicle 50, the capture device 102g implemented below the driver side view mirror 252a and the capture device 102i implemented below the passenger side view mirror 252b may be sufficient to capture the all-around view 254a-254d. In an example, the at least four capture devices 102a-102n may be implemented as part of stereo cameras, each acquiring stereo images of the respective fields of view 206a-206b, 208a-208b, 310a-310b, 312a-312b, 314a-314b, 316a-316b and 318a-318b. The arrangement of the capture devices 102a-102n and 4D imaging radars 104a-104n may be varied according to the design criteria of a particular implementation.

The processors 106a-106n may be configured to combine the video data captured by the capture devices 102a-102n to form an all-around view of the vehicle 50. The exterior field of view may be a 360-degree field of view (e.g., a field of view that captures video data in all or most directions around the ego vehicle 50, a field of view that surrounds the ego vehicle 50, etc.). Pixel data generated by the capture devices 102a-102i and the corresponding fields of view (e.g., the fields of view 206a-206b, 208a-208b, 310a-310b, 312a-312b, 314a-314b, 316a-316b and 318a-318b) and/or data from other capture devices (e.g., the capture devices 102*j*-102*n*, not shown) may be combined to enable the processors 106*a*-106*n* to have access to video data over the full 360-degree field of view.

In some embodiments, the processors 106*a*-106*n* may be configured to perform video stitching operations and/or de-warping operations to form the 360-degree field of view. In some embodiments, the processors 106*a*-106*n* may be configured to analyze the video data captured by each of the capture devices 102*a*-102*n* and aggregate the results to make inferences about all the video data in the all-around view (e.g., the video data from each field of view may be analyzed individually, and the results may be combined to effectively create 360-degree field of view, even if a single video stream of all 360 degrees around the ego vehicle 50 is never actually created).

In some embodiments, the all-around view may have a generally circular shape for the 360-degree field of view. The particular shape of the 360-degree field of view may not be circular. For example, the range of each of the capture devices 102*a*-102*n* may be different. In another example, the physical location of the capture devices 102*a*-102*n* on the ego vehicle 50 may determine how far from the ego vehicle 50 the all-around view is able to reach. The available lighting may be a limitation on the range of the all-around view. The 360-degree field of view may have an irregular shape. The range of the 360-degree field of view may extend farther from the ego vehicle 50 than shown. In some embodiments, the 360-degree field of view may be spherical (e.g., capture the environment above the ego vehicle 50). In some embodiments, the all-around view may not be a full 360-degree field of view (e.g., locations below the ego vehicle 50 may not be captured).

The processors 106*a*-106*n* may be further configured to perform computer vision operations on the video data captured in the all-around view (which may provide an approximation of what the driver 202 would be able to see if the driver 202 was in the ego vehicle 50 and looking in multiple directions simultaneously) and more. For example, the computer vision operations performed by the processors 106*a*-106*n* may be configured to detect and/or recognize objects. The computer vision operations performed by the processors 106*a*-106*n* may be further configured to detect characteristics of objects and/or changes to the characteristics over time.

Vehicles generally do not have side lighting. While the front headlights 302*a*-302*b* and the rear taillights 304*a*-304*b* may provide sufficient lighting for the capture devices 102*a*-102*n* towards the front and rear of the ego vehicle 50, dark areas may remain at the sides of the ego vehicle 50. Dark areas may reduce visibility in portions of the all-around view. In some embodiments, side lighting (e.g., a small LED or LED strip) may be added to the sides of the ego vehicle 50 to reduce and/or eliminate dark areas. The added illumination may also improve image clarity to enable the driver 202 to have a kind of in-person view of the immediate surroundings of the ego vehicle 50.

In an example, dark areas may be caused by lack of sunlight and/or artificial light. In an example, dark areas may be caused by the time of day (e.g., lack of sunlight at night). In another example, dark areas may be caused by a shadow (e.g., an object obstructing sunlight). In yet another example, dark areas may be caused by being located within an interior environment (e.g., a parking garage may have insufficient artificial lighting).

Dark areas may result in inaccuracies in the object detection performed by the processors 106*a*-106*n*. For example, dark areas may result in less ambient light being captured by the lenses 112*a*-112*n* (e.g., weaker input signals IM_A-IM_B). Dark areas may result in video frames being generated by the processors 106*a*-106*n* that have fewer visible details. If the video frames have fewer details visible, then the CNN module 150 may not have sufficient data for analysis to detect objects.

Generally, the front illumination 306 may provide lighting that may reduce and/or eliminate dark areas within the range of the front illumination 306. For example, the front headlights 302*a*-302*b* may provide sufficient lighting towards the front of the ego vehicle 50 for the front-mounted capture device 102*e*. Generally, the rear illumination 308 may provide lighting that may reduce and/or eliminate dark areas within the range of the rear illumination 308. For example, the rear taillights 304*a*-304*b* may provide sufficient lighting towards the rear of the ego vehicle 50 for the rear-mounted capture device 102*c*. Generally, side lighting (e.g., a small LED or LED strip) added to the sides of the ego vehicle 50 may provide lighting that may reduce and/or eliminate dark areas within the range of the side illumination. For example, the side lights may provide sufficient lighting towards the sides of the ego vehicle 50 for the side-mounted capture devices 102*f*, 102*g*, 102*h*, and 102*i*.

Computer vision may be the primary source of data for the apparatus 100 to understand the environment around the ego vehicle 50. The sensor fusion module 152 may be configured to combine information about the objects detected from analyzing the video data and radar data captured with a detection of objects using the proximity sensors (e.g., one or more of the sensors 114). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the radar detection, a confidence level of the detection of the sensors 114, the distance limitations of the sensors 114, whether the computer vision or the radar detects the object at a distance beyond the range of the sensors 114, etc.).

The ego vehicle 50 may implement the apparatus 100 that enables computer vision and 360 degree cameras to provide the all-around view and the additional sensors 114 (e.g., such as ultrasonics, radars, gyroscope, accelerometer, etc.). The additional sensors 114 may provide supplemental information about the environment near the ego vehicle 50. Some of the supplemental information (e.g., from the 4D imaging radars 104*a*-104*n*) may provide data about objects/obstacles near the ego vehicle 50 that the capture devices 102*a*-102*n* may not be capable of detecting because of dark areas on the sides of the ego vehicle 50. However, the additional sensors 114 may not provide sufficient information for all autonomous driving maneuvers. Furthermore, if dark areas on the sides of the ego vehicle 50 prevent computer vision operations, the results of the computer vision analysis may not be available to provide redundancy and/or error-checking for the sensors 114.

The processors 106*a*-106*n* may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to autonomously (e.g., avoid collisions, provide warnings, store information, avoid roadway hazards such as potholes, etc.). For example, whether a detected scenario is considered an event may be determined by the decision module 158. In one example, the event may correspond to detecting a scenario that may correspond to an autonomous driving maneuver (e.g., detecting a parking spot). The events may be detected based on the computer vision operations performed on the video data captured using the capture devices 102a-102n and the 4D point cloud data captured using the 4D imaging radar sensors 104a-104n. The events may be detected based on readings from the sensors 114. For example, the sensor fusion module 152 may be configured to combine information determined using the computer vision operations and information detected using the sensors 114 to make inferences that may be used by the decision module 158.

Figure 5:
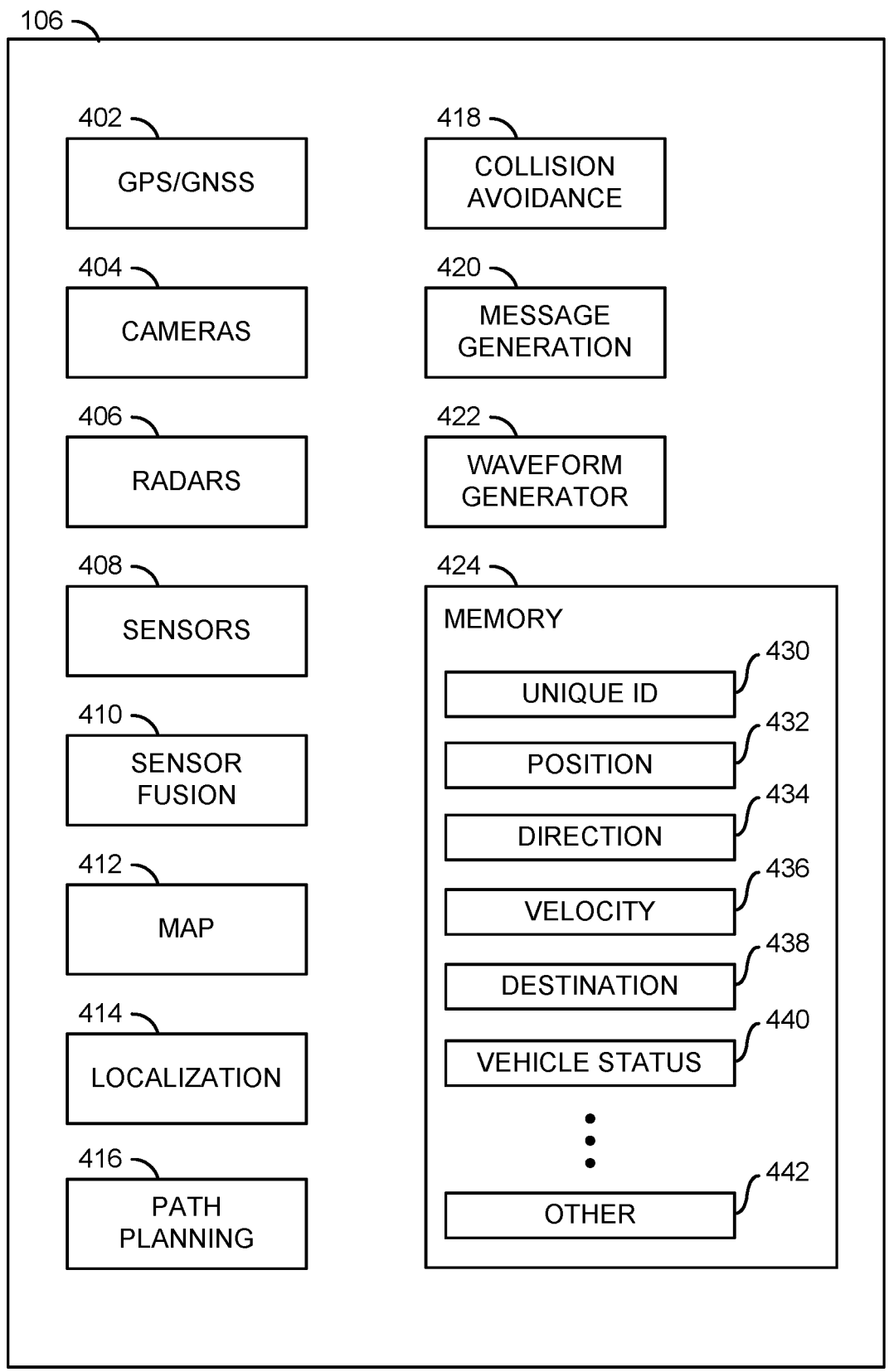
FIG. 5 is a diagram illustrating a processor configured to implement vehicle-to-vehicle (V2V) communication using radar.

Referring to FIG. 5, a diagram is shown illustrating a processor 106 configured to implement vehicle-to-vehicle (V2V) communication using radar in accordance with an embodiment of the invention. In an example, the processor 106 may comprise a block (or circuit) 402, a block (or circuit) 404, a block (or circuit) 406, a block (or circuit) 408, a block (or circuit) 410, a block (or circuit) 412, a block (or circuit) 414, a block (or circuit) 416, a block (or circuit) 418, a block (or circuit) 420, a block (or circuit) 422, a block (or circuit) 422, and/or a block (or circuit) 424. The processor 106 may comprise other components (not shown). The block 402 may implement a satellite navigation (e.g., GPS, GNSS, etc.) module. The block 404 may implement a camera interface module. The block 406 may implement a radar interface module. The block 408 may implement a vehicle sensor interface module. The block 410 may implement a sensor fusion module. The block 412 may implement an electronic map or map interface module. The block 414 may implement a localization module. The block 416 may implement a path planning module. The block 418 may implement a collision avoidance module. The block 420 may implement a message generation module. The block 422 may implement a radar waveform generation module. The block 424 may implement a parameter and status information memory. In some embodiments, the processor 106 may omit one or more of the blocks 402-424. In an example, the modules 402-424 may each be implemented as dedicated hardware modules of the processor 106. In another example, some or all of the modules 402-424 may each be implemented as software and/or a combination of hardware and software. The number, type and/or arrangement of the components of the processor 106 may be varied according to the design criteria of a particular implementation.

In an example, the block 402 generally allows the processor 106 to determine a position of the vehicle based on signals received from a constellation of satellites. In an example, the block 402 may provide an interface with a pre-certified dedicated global positioning satellite (GPS) and/or global navigation satellite system (GNSS) module. In an example, the block 404 may provide an interface enabling the processor 106 to control and communicate with one or more cameras distributed around the vehicle. In an example, the block 406 may provide an interface enabling the processor 106 to control and communicate with one or more radar modules distributed around the vehicle. In an example, the block 408 may provide an interface enabling the processor 106 to receive sensor signals from various sensors of the vehicle.

The sensor fusion module 410 may be configured to analyze information received from multiple sensors, capture devices 102a-102n, and 4D imaging radar devices 104a-104n via the sensor interface 408, the camera interface 404, and the radar interface 406, respectively. By analyzing various data from disparate sources, the sensor fusion module 410 may be capable of making inferences about the data that may not be possible from one of the data sources alone. For example, the sensor fusion module 410 may analyze video data as well as radar, lidar, inertial, motion, V2X, location data (e.g., GPS, GNSS, ADAS, etc.), gaze direction, driver state, battery status, and/or other sources to develop a model of a scenario to support decision making. The sensor fusion module 410 may also provide time correlation, spatial correlation and/or reliability among the data being received from different sensors around the vehicle.

In an example, the sensor fusion module 410 may spatially overlay an object captured by a camera with the same object captured by a 4D imaging radar for better identification and/or ranging (distance and relative velocity) to that object. In a time correlation example, an object may be seen by two sensors at slightly different times (e.g., side-facing sensors near the front bumper and the rear bumper). The sensor fusion module 410 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 410 may determine the reliability of objects detected by each sensor. The sensor fusion module 410 may adjust the weighting used to overlay the data to give more weight to reliable data and/or less weight to unreliable data (e.g., one of the capture devices 102a-102n may have low reliability in foggy conditions, but one of the radar devices 104a-104n may have good reliability in foggy conditions). A confidence that the object is really there and is correctly identified may also be calculated in the sensor fusion module 410.

The map module 412 may be configured to provide road and environment information based on a location of the vehicle indicated by satellite navigation information from the module 402 and/or inertial measurements made by the vehicle. The localization module 414 may determine the reliability a determined position of the vehicle by analyzing satellite data, map data, sensor data, object data captured by a camera and/or a 4D imaging radar. The path planning module may be configured to determine a path the vehicle will take to reach a destination based on a current position. The collision avoidance module 418 may be configured to provide warnings or activate safety features like emergency braking based on information received from one or more of the other modules 402-416.

The message generation module 420 may be configured to generate a message containing the status information of the vehicle status determined by analyzing information from the other modules. The message containing the status information of the vehicle may be transmitted to other vehicles via a vehicle-to-vehicle (V2V) communication using radar technique in accordance with an embodiment of the invention. In an example, the message generation module 420 may format the respective vehicle status information parameters as a simple status information message similar to communication standards defined by the National Marine Electronics Association (NMEA), which are used in marine navigation. In an example, the message generation module 420 may place the vehicle status parameters into corresponding fields of a vehicle status message. In an example, fields for which there are no parameters available may be left blank. In an example, the message generation module 420 may begin generating a message by placing the UID of the vehicle that is broadcasting the status message in the first field following a start of message character (or flag or indicator) The message generation module 420 may continue generating the message by inserting available status information parameters (or data or values) in corresponding fields of the vehicle status message. The message generation module 420 may send the vehicle status message to the waveform generation module 422 for embedding in the radar chirp.

The waveform generation module 422 may be configured to generate waveform characteristic data based on the vehicle status message received from the message generation module 420. The waveform characteristic data generated by the waveform generation module 422 may be used by one or more of the image radar devices 104a-104n to transmit (broadcast) the status information to other vehicles (and/or infrastructure) in the environment surrounding the vehicle. In an example, the waveform generation module 422 may be configured to generate waveform characteristic data to define the radar chirp that has the status information embedded. In an example, the waveform generation module 422 may be configured to modify a modulation scheme of the linear frequency modulated waveform (LFMW), or chirp, of the respective radar signals based on the status information message. The status information message may then be recovered by the other vehicles from the received radar signal.

The memory 424 may be configured to store various status information parameters of the vehicle itself and the other vehicles in the environment surrounding the vehicle. In an example, the memory 424 may have a field (or location) 430 that stores the unique identifier (UID) of the vehicle, a field (or location) 432 that stores the current position of the vehicle, a field (or location) 434 that stores a current direction of movement of the vehicle, a field (or location) 436 that stores a velocity vector of the vehicle, and a field (or location) 438 that stores a destination of the vehicle. In an example, other fields (or locations) 440 may be implemented in the memory 424 that may store other types of status information (e.g., operator status, vehicle-state, planned maneuvers, etc.).

Figure 6:
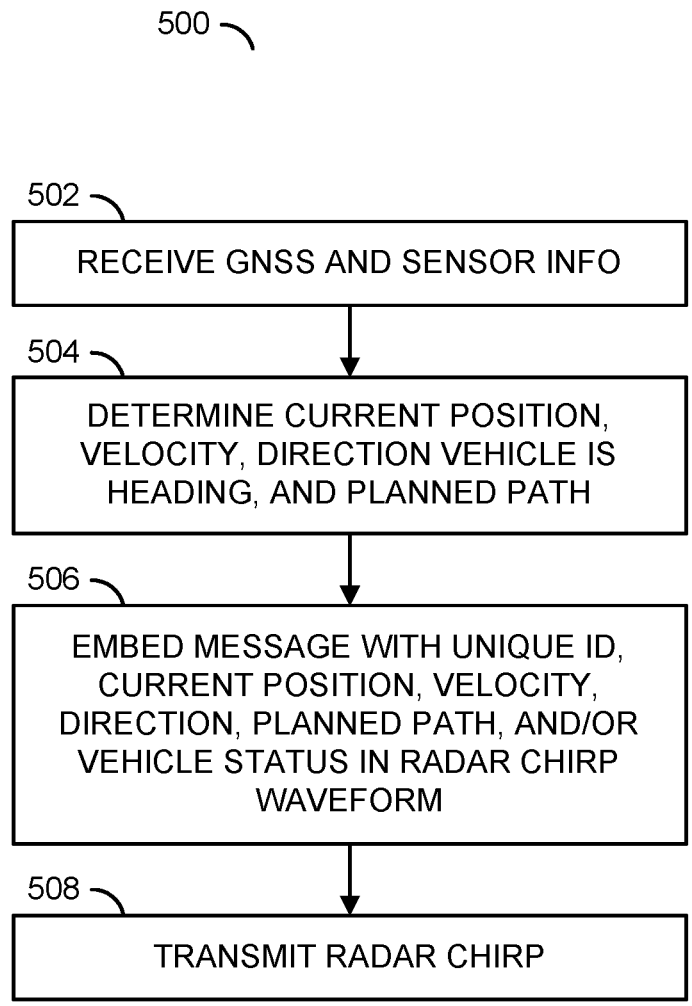
FIG. 6 is a diagram illustrating a process in accordance with an embodiment of the invention.

Referring to FIG. 6, a flow diagram is shown illustrating a process 500 in accordance with an embodiment of the invention. The process (or method) 500 may be implemented to generate and transmit status information of a vehicle using radar in an example embodiment. The method 500 generally comprises a step (or state) 502, a step (or state) 504, a step (or state) 506, and a step (or state) 508.

The step 502 may start the method 500. In the step 502, the processors 106a-106n may receive satellite navigation information and sensor readings from various sensors of the vehicle. In the step 504, the processors 106a-106n may determine a current position, velocity, direction vehicle is heading, and planned path based on the satellite navigation information and sensor readings. The method 500 may then move to the step 506. In the step 506, the method 500 may generate waveform characteristic data that will embed a unique identifier of the vehicle along with one or more of the current position, velocity, direction vehicle is heading, and planned path in a radar chirp transmitted by one or more of the radars 104a-104n. The method 500 may then move to the step 508. In the step 508, the method 500 may transmit the radar chirp.

Figure 7:
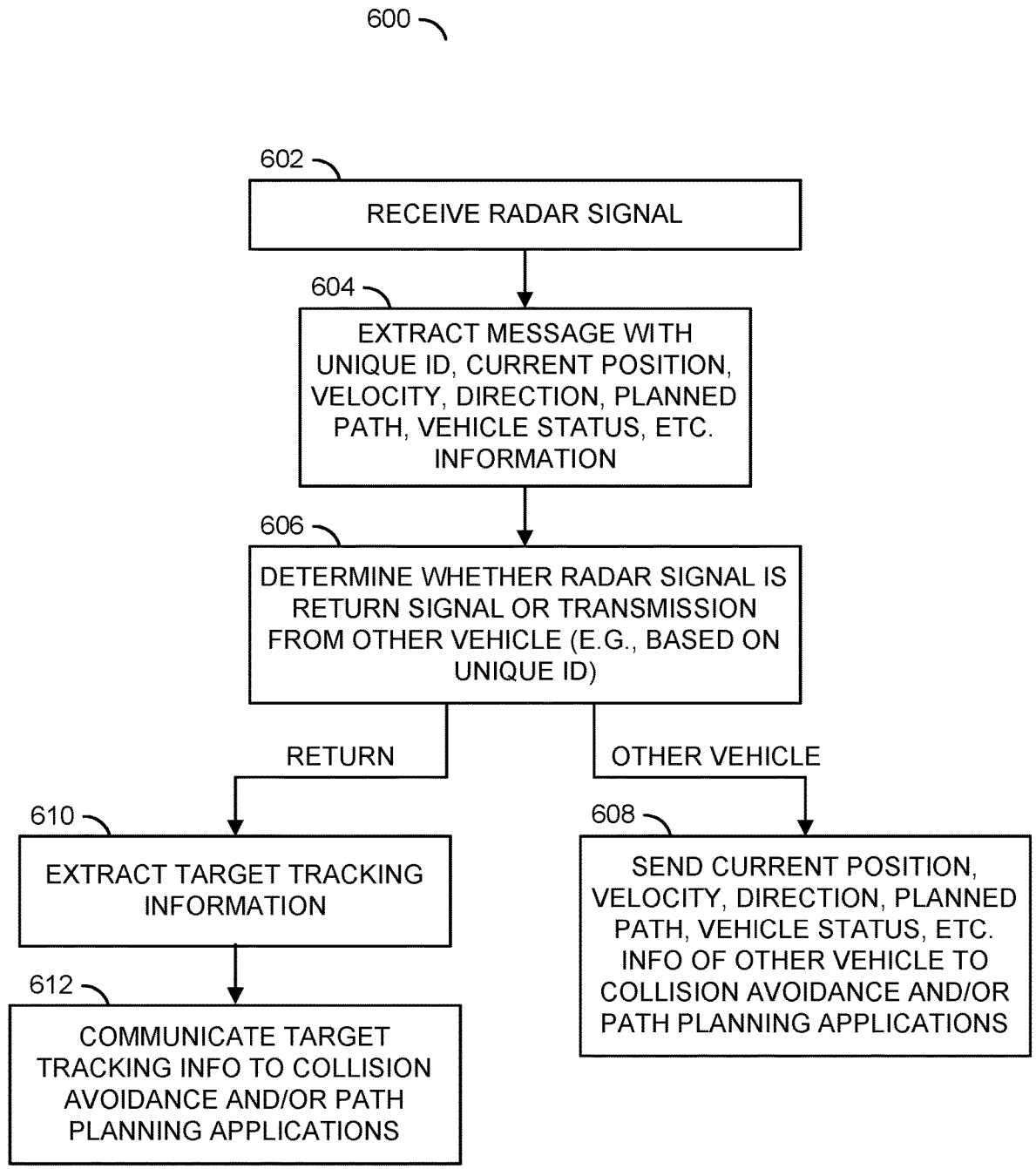
FIG. 7 is a diagram illustrating a process in accordance with an embodiment of the invention.

Referring to FIG. 7, a diagram is shown illustrating a process in accordance with an embodiment of the invention. A process (or method) 600 may be implemented to obtain status information broadcast by vehicles other than the ego vehicle. The method 600 generally comprises a step (or state) 602, a step (or state) 604, a step (or state) 606, a step (or state) 608, a step (or state) 610, and a step (or state) 612.

The step 602 may start the method 600. In the step 602, the processors 106a-106n may receive one or more radar signals. In the step 604, the processors 106a-106n may extract one or more messages comprising status information. The method 600 may then move to the step 606. In the step 606, the method 600 may determine whether the received radar signal is a return signal (e.g., reflected off a target in the environment around the vehicle) or a transmission from another vehicle in the environment around the vehicle. When the received radar signal is a transmission from another vehicle, the method 600 may then move to the step 608. When the received radar signal is a return signal, the method 600 may then move to the step 610. In the step 608, the method 600 may send the extracted status information (e.g., current position, velocity, direction, planned path, vehicle status, etc.) of the other vehicle(s) to the collision avoidance and/or path planning modules. In the step 610, the method 600 may extract target information (e.g., bearing, azimuth, etc.). The method 600 may then move to the step 612. In the step 612, the method 600 may send the extracted target information to the collision avoidance and/or path planning modules.

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, MRAM (magneto random access memories), FRAM (ferroelectric random access memories), RRAM/ReRAM (resistive random access memories), and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to (i) receive sensor readings from a plurality of sensors of a vehicle, (ii) communicate a radar chirp to a radar transceiver module, and (iii) receive a radar signal from said radar transceiver module; and
a processor configured to (i) generate a status information message in response to said sensor readings and an identifier code of said vehicle, (ii) determine waveform characteristic data in response to said status information message, (iii) embed said waveform characteristic data in said radar chirp to communicate said status information message, and (iv) use waveform characteristic data extracted from said radar signal to execute navigation of said vehicle, wherein
  (a) said status information message comprises a plurality of predefined data fields,
  (b) a first of said predefined data fields comprises a unique source identifier,
  (c) said status information message generated by said processor uses said identifier code of said vehicle for said unique source identifier,
  (d) one of said predefined data fields comprises a planned maneuver,
  (e) said waveform characteristic data extracted from said radar signal is (i) target tracking information when said unique source identifier comprises said identifier code of said vehicle, and (ii) said status information message generated by a second vehicle when said unique source identifier corresponds to said second vehicle,
  (f) said unique source identifier comprises said identifier code of said vehicle when said radar signal is a reflection of said radar chirp, and
  (g) said unique source identifier corresponds to said second vehicle when said radar signal is generated by said second vehicle.

2. The apparatus according to claim 1, wherein said predefined data fields comprise one field for a position of said vehicle, one field for a direction of travel of said vehicle, one field for a velocity of said vehicle, one field for a destination of said vehicle, and one field for a planned path of said vehicle.

3. The apparatus according to claim 1, wherein said status information message comprises one or more of:
an operator status of the vehicle comprising at least one of human operation, fully autonomous (AD) operation, and semi-AD operation; and
a vehicle state of the vehicle comprising at least one of being in a parking mode, being in an urban driving mode, being in a highway-pilot mode, being in a limp-mode, and having a fallback system engaged.

4. The apparatus according to claim 1, wherein said status information message generated by said second vehicle comprises a field for a position of said second vehicle, a field for a direction of travel of said second vehicle, a field for a velocity of each of said one or said second vehicle, a field for a destination of said second vehicle, and a field for a planned maneuver of said second vehicle.

5. The apparatus according to claim 1, wherein said status information message generated by said second vehicle comprises one or more of:
an operator status of the second vehicle comprising at least one of human operation, fully autonomous (AD) operation, and semi-AD operation; and
a vehicle state of the second vehicle comprising at least one of being in a parking mode, being in an urban driving mode, being in a highway-pilot mode, being in a limp-mode, and having a fallback system engaged.

6. The apparatus according to claim 1, wherein said radar chirp is transmitted by said radar transceiver module implemented by said vehicle.

7. The apparatus according to claim 1, wherein said planned maneuver comprises one or more of leaving a parking space, changing lanes, entering a main road from a side road, and entering a main road from an entrance ramp.

8. The apparatus according to claim 1, wherein (i) said target tracking information is used by said processor to determine a current location of an object in an environment and (ii) said status information message generated by said second vehicle is used by said processor to predict a location of said second vehicle.

9. The apparatus according to claim 1, wherein said processor is configured to extract both said target tracking information and said status information message generated by said second vehicle using data received from said radar transceiver module.

10. The apparatus according to claim 1, wherein (i) said status information message generated by said processor comprises said sensor readings, said identifier code and said planned maneuver of said vehicle and (ii) said status information message generated by said second vehicle comprises sensor readings of said second vehicle, said unique source identifier corresponding to said second vehicle, and a planned maneuver of said second vehicle.

11. A method of communicating vehicle status information to another vehicle comprising:
receiving sensor readings from a plurality of sensors of a vehicle;
generating a status information message in response to said sensor readings and an identifier code of said vehicle;
determining waveform characteristic data in response to said status information message
embedding said waveform characteristic data in a radar chirp to communicate said status information message;
communicating said radar chirp to a radar transceiver;
receiving a radar signal from said radar transceiver; and
using waveform characteristic data extracted from said radar signal to execute navigation of said vehicle, wherein
(a) said status information message comprises a plurality of predefined data fields,
(b) a first of said predefined data fields comprises a unique source identifier,
(c) said status information message generated uses said identifier code of said vehicle for said unique source identifier,
(d) one of said predefined data fields comprises a planned maneuver,
(e) said waveform characteristic data extracted from said radar signal is (i) target tracking information when said unique source identifier comprises said identifier code of said vehicle, and (ii) said status information message generated by a second vehicle when said unique source identifier corresponds to said second vehicle,
(f) said unique source identifier comprises said identifier code of said vehicle when said radar signal is a reflection of said radar chirp, and
(g) said unique source identifier corresponds to said second vehicle when said radar signal is generated by said second vehicle.

12. The method according to claim 11, wherein said predefined data fields comprise one field for a position of said vehicle, one field for a direction of travel of said vehicle, one field for a velocity of said vehicle, one field for a destination of said vehicle, and one field for a planned maneuver path of said vehicle.

13. The method according to claim 11, wherein said status information message comprises one or more of:
an operator status of the vehicle comprising at least one of human operation, fully autonomous (AD) operation, and semi-AD operation; and
a vehicle state of the vehicle comprising at least one of being in a parking mode, being in an urban driving mode, being in a highway-pilot mode, being in a limp-mode, and having a fallback system engaged.

14. The method according to claim 11, wherein said status information message generated by said second vehicle comprises a field for a position of said second vehicle, a field for a direction of travel of said second vehicle, a field for a velocity of said second vehicle, a field for a destination of said second vehicle, and a field for a planned maneuver of said second vehicle.

15. The method according to claim 11, wherein said status information message generated by said second vehicle comprises one or more of:
an operator status of the second vehicle comprising at least one of human operation, fully autonomous (AD) operation, and semi-AD operation; and
a vehicle state of the second vehicle comprising at least one of being in a parking mode, being in an urban driving mode, being in a highway-pilot mode, being in a limp-mode, and having a fallback system engaged.

16. The method according to claim 11, wherein said planned maneuver comprises one or more of leaving a parking space, changing lanes, entering a main road from a side road, and entering a main road from an entrance ramp.

17. The method according to claim 11, wherein comprising the steps of:
using said target tracking information to determine a current location of an object in an environment; and
using said status information message generated by said second vehicle to predict a location of said second vehicle.

18. The method according to claim 11, wherein both said target tracking information and said status information message generated by said second vehicle is extracted using data received from said radar transceiver.

19. The method according to claim 11, wherein (i) said status information message corresponding to said vehicle comprises said sensor readings, said identifier code and said planned maneuver of said vehicle and (ii) said status information message generated by said second vehicle comprises sensor readings of said second vehicle, said unique source identifier corresponding to said second vehicle, and a planned maneuver of said second vehicle.

* * * * *